United States Patent
Ubaldi (10) Patent No.: US 9,642,310 B2
(45) Date of Patent: May 9, 2017

(54) ROTARY CLEANING UNIT FOR A CONVEYOR MOUNTED ON A HARVESTING DEVICE

(71) Applicant: ROC S.R.L., Poggio Torriana (Rimini) (IT)

(72) Inventor: Raffaele Ubaldi, Santa Giustina Di Rimini (IT)

(73) Assignee: ROC S.R.L., Poggio Torriana (IT)

( * ) Notice: Subject to any disclaimer, the term of this patent is extended or adjusted under 35 U.S.C. 154(b) by 62 days.

(21) Appl. No.: 14/452,022

(22) Filed: Aug. 5, 2014

(65) Prior Publication Data
US 2015/0040530 A1  Feb. 12, 2015

(30) Foreign Application Priority Data
Aug. 8, 2013  (IT) ............................... RN2013A0031

(51) Int. Cl.
| | | |
|---|---|---|
| *A01D 75/00* | (2006.01) | |
| *A01D 89/00* | (2006.01) | |
| *A01D 84/00* | (2006.01) | |

(52) U.S. Cl.
CPC ............. *A01D 75/00* (2013.01); *A01D 84/00* (2013.01); *A01D 89/002* (2013.01); *A01D 89/008* (2013.01)

(58) Field of Classification Search
CPC .................... A01D 75/00; A01D 57/00; A01D 84/00–84/02; A01D 89/00–89/0008
See application file for complete search history.

(56) References Cited

U.S. PATENT DOCUMENTS

| | | | | |
|---|---|---|---|---|
| 1,979,974 A | * | 11/1934 | MacGregor ............ | A01D 89/00 100/100 |
| 2,168,266 A | * | 8/1939 | McElwain ............. | A01D 84/00 56/189 |

(Continued)

FOREIGN PATENT DOCUMENTS

| | | |
|---|---|---|
| EP | 0255458 A1 | 2/1988 |
| EP | 0853872 A1 | 7/1998 |
| WO | 2008000993 A1 | 1/2008 |

OTHER PUBLICATIONS www.AtvTireStore.com, May 1, 2011, www.atvtirestore.com/carlisle_knobby_atv_tires.html.*

*Primary Examiner* — Alicia Torres
*Assistant Examiner* — Adam Behrens
(74) *Attorney, Agent, or Firm* — Pearne & Gordon LLP (57) ABSTRACT

Described is a cleaning unit for a device for harvesting long agricultural products, such as grass, straw, pulses, biomass products and the like, of the type that can be pulled by a pulling vehicle along an advancing axis and provided with pick-up means (102) for harvesting said products and with unloading means (106) located operatively downstream of the pick-up means (102), forming a supporting surface (B) for the agricultural products harvested and mobile transversally to said advancing axis along a predetermined axis of movement (A) for releasing the agricultural products to the sides of said pulling vehicle, wherein the cleaning unit comprises a wheel (2) comprising a peripheral annular surface (3) and rotatable about its own axis of rotation (C) and joining means (5) designed to connect said wheel (2) to said harvesting device (100) in such a way that said axis of rotation (C) is transversal to said axis of movement (A) and wherein said peripheral annular surface (3) is positioned at a predetermined height in such a way as to form, between the (Continued)

peripheral annular surface (3) and the supporting surface (B), an agricultural product feed section (4).

16 Claims, 3 Drawing Sheets

(56) References Cited

U.S. PATENT DOCUMENTS

| | | | | |
|---|---|---|---|---|
| 2,335,764 A * | 11/1943 | Innes | A01D 89/00 198/512 |
| 2,975,578 A * | 3/1961 | Drauden | A01D 43/00 239/687 |
| 3,773,167 A * | 11/1973 | McGinnis | B65G 23/00 198/818 |
| 3,815,346 A * | 6/1974 | Nelson | A01F 29/01 56/14.3 |
| 3,853,016 A * | 12/1974 | Lane, III | A01D 45/023 198/516 |
| 3,921,785 A * | 11/1975 | Huitink | A01D 57/00 198/516 |
| 4,182,098 A * | 1/1980 | Kass | A01D 34/83 56/14.5 |
| 4,244,163 A * | 1/1981 | Gantzer | A01D 57/30 56/13.6 |
| 4,287,710 A * | 9/1981 | van der Lely | A01B 9/003 172/92 |
| 4,730,447 A * | 3/1988 | Fisher | A01D 84/00 56/366 |
| 4,736,577 A * | 4/1988 | Fisher | A01D 84/00 56/370 |
| 4,748,803 A * | 6/1988 | MacMaster | A01D 78/001 56/366 |
| 4,768,333 A * | 9/1988 | Reber | A01D 57/20 56/192 |
| 4,910,951 A * | 3/1990 | Reilly | A01D 84/00 56/370 |
| 4,926,625 A * | 5/1990 | Laquerre | A01D 84/00 56/366 |
| 4,965,991 A * | 10/1990 | Sauder | A01D 41/14 56/119 |
| 5,203,154 A * | 4/1993 | Lesher | A01D 57/12 56/366 |
| 5,251,431 A * | 10/1993 | Shoop | A01D 84/00 239/685 |
| 5,301,496 A * | 4/1994 | Sudbrack | A01D 57/20 403/325 |
| 6,022,082 A | 2/2000 | O'Brien | |
| 6,354,429 B2 * | 3/2002 | Kuhlmann | A01D 84/00 198/300 |
| 6,715,274 B2 * | 4/2004 | Peeters | A01D 84/00 56/366 |
| 7,043,892 B1 * | 5/2006 | Kessler | A01D 84/00 56/341 |
| 7,310,929 B2 * | 12/2007 | Dow | A01B 73/02 172/311 |
| 7,448,491 B1 * | 11/2008 | Tippery | A01D 57/20 198/813 |
| 7,823,371 B2 | 11/2010 | Gantzer et al. | |
| 8,464,862 B2 * | 6/2013 | Honeycutt | B65G 15/08 198/822 |
| 2009/0241503 A1 * | 10/2009 | Babler | A01D 84/00 56/366 |
| 2009/0282800 A1 | 11/2009 | Gantzer | |
| 2010/0037584 A1 * | 2/2010 | Dow | A01B 73/02 56/376 |

* cited by examiner

ROTARY CLEANING UNIT FOR A CONVEYOR MOUNTED ON A HARVESTING DEVICE

BACKGROUND OF THE INVENTION

This invention relates to a cleaning unit for a device for harvesting long agricultural products such as grass, straw, pulses, biomass products and the like, a harvesting device which uses the cleaning unit and a method for improving the harvesting device (by installing said cleaning unit).

Harvesting devices are normally used for harvesting grass, straw or hay (cut by other machines) from the ground or for harvesting pulses; or in any case, for harvesting like agricultural products (generally plants) which are long and thin in shape.

For this purpose, they are connected to a pulling vehicle (such as a tractor or a self-propelled agricultural machine) which is used to tow them.

Prior art harvesting devices have a main axis of extension which, during use, remains transversal to the axis of movement of the pulling vehicle. To lift the agricultural products from the ground and move them (prior to unloading), harvesting devices use a plurality of harvesting elements associated therewith and driven by a movement system. The movement system is generally driven by a Cardan joint or the like which, through a power take-off, draws drive power from the engine of the pulling vehicle.

Each harvesting element is in turn provided with one or more juxtaposed tines. The harvesting elements (and the respective tines) are generally arranged around the main axis of extension in rows parallel to the main axis of extension itself. Each harvesting element (and the respective tines) is driven by the movement system along a closed trajectory which surrounds the main axis of extension. The tines are straight elements with one end coupled (either directly or by means of parts of the respective harvesting element) to the movement system and the other end free.

Operatively downstream of the harvesting elements, devices of this type generally also comprise means for unloading the agricultural products harvested, usually consisting of movement devices, such as conveyor belts, chain conveyors or screw conveyors, located along the axis of extension of the harvesting device immediately downstream of the harvesting elements, in order to transport the agricultural products to the sides of the pulling vehicle.

It should be noted that each of the unloading means has a respective axis of movement, generally parallel to the main axis of extension of the frame, that is, transversal to the advancing axis.

In light of this, prior art unloading means extend between their two opposite ends, one of which, in use, constitutes a product release zone.

At that end, the continuous flow of agricultural products provides a good guarantee of keeping the mechanical parts and the unloading means clean because it is difficult for the products to get entangled between the moving parts.

At the other end, on the other hand, where the flow starts and is, obviously, much slower, the agricultural products harvested tend to get trapped between the moving parts and to build up, thereby interfering with the movement of the unloading means and with the operation of the pick-up means.

This problem becomes even more critical when the unloading means are of a relatively unforceful type such as, for example, chain conveyors or conveyor belts (with or without tracks).

It is known that agricultural machines are not frequently cleaned, and thus, any "self-cleaning" feature, that is, the ability of moving mechanical parts to remain as clean as possible automatically, is crucial and any improvement in this respect can play a decisive role in the marketability of an agricultural implement.

SUMMARY OF THE INVENTION

This invention has for an aim to overcome the above mentioned disadvantages of the prior art by providing a cleaning unit for a device for harvesting long agricultural products such as grass, straw, pulses, biomass products and the like, a harvesting device which uses the cleaning unit and a method for improving the harvesting device.

More specifically, the aim of this invention is to provide a cleaning unit for cleaning an agricultural product harvesting device and capable of improving harvesting device performance and reducing device maintenance requirements in an economical manner.

This invention thus has for an aim to provide a harvesting device for harvesting agricultural products which is at once reliable and economical.

Another aim of the invention is to provide a simple and inexpensive method for improving a harvesting device for harvesting agricultural products.

These aims are achieved by a cleaning unit for a device for harvesting long agricultural products such as grass, straw, pulses, biomass products and the like, as set out in one or more of claims 1 to 7.

These aims are also achieved by a harvesting device for harvesting long agricultural products such as grass, straw, pulses, biomass products and the like, as set out in one or more of claims 8 to 14.

These aims are also achieved by a method for improving a harvesting device for harvesting long agricultural products such as grass, straw, pulses, biomass products and the like, as set out in claim 15.

More specifically, the above mentioned aims are achieved by a cleaning unit for a device for harvesting long agricultural products, such as grass, straw, pulses, biomass products and the like, of the type that can be pulled by a pulling vehicle along an advancing axis and provided with pick-up means for harvesting said products and with unloading means located operatively downstream of the pick-up means, forming a supporting surface for the agricultural products harvested and mobile transversally to the advancing axis along a predetermined axis of movement for releasing the agricultural products to the sides of said pulling vehicle.

According to the invention, the cleaning unit comprises a wheel comprising a peripheral annular surface and rotatable about its own axis of rotation and joining means designed to connect the wheel to the harvesting device in such a way that the axis of rotation is transversal to the axis of movement and the peripheral annular surface is positioned at a height such as to form, between the peripheral annular surface and the supporting surface, an agricultural product feed section.

It should be noted that the wheel is rotatable in the same direction as the unloading means.

Advantageously, it is thus possible to keep the unloading means (preferably a conveyor belt) clean, in particular in the outer zone where the product flow effect is limited.

In effect, the presence of the wheel produces in the feed section a pulling action on the products which prevents them from building up or getting entangled.

In order to make the action of the cleaning unit more forceful, the peripheral annular surface of the wheel has a series of apexes and grooves. In other words, the peripheral annular surface is substantially a rough surface so as to increase its grip on the agricultural products.

In the preferred embodiment, the peripheral annular surface has a plurality of notches or teeth projecting radially therefrom to form the plurality of apexes (and corresponding grooves) designed to make the action of the cleaning unit on the products forceful.

Since the amount of product "fed" by the cleaning unit is variable, the unit comprises elastic means operatively interposed between the joining means and the peripheral annular surface of the wheel.

The elastic means are configured to allow the peripheral annular surface to move (elastically) along an axis transversal to the axis of rotation of the wheel between a first position which, in use, is proximal to said supporting surface, and a second position which, in use, is distal from said supporting surface.

Advantageously, it is thus possible to adapt the size of the feed section to an instantaneous quantity of agricultural products passing through the feed section so as to increase the friction on the products.

In other words, the peripheral annular surface of the wheel remains constantly in contact with (pressed on) the products so as to move them along.

In a first embodiment, the elastic means are defined by the wheel itself, which comprises a rigid rim with a deformable tyre placed around it.

In other words, the elastic means are at least partly formed by the annular inner tube interposed between the tyre and the rim (as well as by the elasticity of the material the tyre is made of).

Alternatively (or in combination), the elastic means may be at least partly formed by a suspension operatively interposed between the wheel and the joining means.

It should be noted that the wheel may be idle, or driven (that is, set in rotation) by specific actuating means, preferably associated with the movement means which drive the unloading means.

In embodiments where the wheel is idle, rotation is imparted to it by the unloading means themselves (counter-rotating or by rolling) or by the products moved by them.

Thus, the unloading means (in particular the conveyor belt) constitute means for actuating the wheel.

Preferably, therefore, the peripheral annular surface of the wheel abuts against the conveyor belt in such a way that the movement of the conveyor belt drives the wheel in rotation about its axis of rotation.

More preferably, the conveyor belt comprises a plurality of transversal bars (transversal to the axis of belt movement) projecting from the supporting surface in such a way as to mesh (in gear-like fashion) with the teeth or notches protruding from the peripheral annular surface of the wheel in order to drive it in rotation.

In this regard, it should be noted that the bars are made of a material able to transmit motion, preferably steel.

Thus, once the cleaning unit is installed, the harvesting device (also an object of this invention comprises a frame having a main axis of extension which, during use, remains transversal to the axis of movement of the pulling means, pick-up means for harvesting the agricultural products and designed to harvest the agricultural products from the ground, unloading means operatively located downstream of the pick-up means, forming a supporting surface for the agricultural products harvested and mobile transversally to said advancing axis along the axis of extension (or axis of movement) for releasing the agricultural products to the sides of the pulling vehicle, where the unloading means extend between a first longitudinal edge associated with the pick-up means for receiving the agricultural products, and a second longitudinal edge opposite to the first edge. According to the invention, the device also comprises at least one cleaning unit according to any one of the accompanying claims, positioned close to the unloading means.

Preferably, the unloading means are constituted by a conveyor belt operatively located downstream of the pick-up means, constituting a supporting surface for the agricultural products harvested and mobile along said main axis of movement to release the agricultural products to the sides of the pulling vehicle.

More precisely, the frame comprises at least one side panel rising transversally to the conveyor belt and located in the proximity of the second longitudinal edge to which the joining means of the cleaning unit are anchored, in such a way that the axis of rotation of the wheel is transversal to the axis of movement and the peripheral annular surface is located at a height such as to form an agricultural product feed section.

Still more preferably, the cleaning unit is located at a first end of the conveyor belt, opposite to the zone where the agricultural products are released, so as to prevent the agricultural products from stopping at a position where, in prior art devices, the conveyor belt cannot effectively act on them.

Preferably, also, the feed section is shaped to form a guide for the agricultural products, facilitating the function of the cleaning unit.

In other words, the feed section has at least one (initial) stretch decreasing from a first face (infeed, facing the first edge) towards a second face.

It should be noted that the expression "initial stretch" is used because the infeed area of this stretch faces the pick-up means and is thus aligned with the harvesting axis (transversal, preferably at right angles, to the axis of extension).

Advantageously, that way, the action of the cleaning unit is optimized and its efficiency maximized.

It should be noted that to improve the structure of a harvesting device by mounting the cleaning unit, it is possible to implement the improvement method according to this invention.

The method comprises:
determining an end for the release of the agricultural products by the unloading means (preferably of the conveyor belt) depending on a direction of movement thereof;
preparing at least one wheel comprising a peripheral annular surface;
positioning the wheel at an end of the unloading means opposite to the releasing end;
fixing the wheel to a frame of the harvesting device in such a way that the wheel is rotatable about its own axis of rotation transversal to said axis of movement and said peripheral annular surface is positioned at a predetermined distance from the supporting surface such as to form, between the peripheral annular surface and the supporting surface, an agricultural product feed section.

BRIEF DESCRIPTION OF THE DRAWINGS

These and other features will become more apparent from the description of a preferred non-limiting example embodiment of a cleaning unit for a device for harvesting long agricultural products such as grass, straw, pulses, biomass products and the like, of a harvesting device which uses the cleaning unit and of a method for improving the harvesting device, as illustrated in the accompanying drawings, in which:

FIG. 1 shows a front view of a device according to the invention for harvesting long agricultural products such as grass, straw, pulses, biomass products and the like;

DESCRIPTION OF THE PREFERRED EMBODIMENTS

With reference to the accompanying drawings, the numeral 1 denotes cleaning unit for a device 100 according to the invention for harvesting long agricultural products such as grass, straw, pulses, biomass products and the like.

The harvesting device 100 is of the type which can be moved by a movement (or pulling) vehicle along a path on which a multitude of long, and preferably thin, agricultural products lie, the harvesting device 100 being designed to lift them from the ground using pick-up means 102 and to transport them on specific unloading means or into a receiving chamber by means of a specific movement system.

More precisely, the device comprises a frame 101 having a main axis of extension "A" which, during use, remains transversal to the axis of movement (or of advancing) of the pulling vehicle. The frame preferably comprises coupling means (not illustrated) by which it is connected to the pulling vehicle and protruding transversely (preferably at right angles) to the direction of extension "A".

The device 100 comprises pick-up means 102 for harvesting the agricultural products. Preferably, the pick-up means 102 comprise a plurality of rotatable elements 103, each in turn equipped with at least one long harvesting tine 103a.

It should be noted that the harvesting elements 103 are arranged in succession along the axis of extension "A" (and spaced, preferably equispaced, from each other).

Advantageously, therefore, the harvesting elements 102 are arranged along the extension of the device, thereby increasing the working portion thereof.

Preferably, the tines 103a are arranged around the same central axis of rotation, oriented radially thereto in spoke-like fashion.

In this regard, the harvesting device 100 comprises a movement system for moving each of the harvesting elements 103 along a closed path surrounding the main axis of extension "A" (corresponding to the aforementioned central axis). In other words, the product harvesting axis is transversal, preferably at right angles, to the axis of extension "A".

The closed path comprises a transporting stretch along which the agricultural product is transported between a pickup point where the product is lifted from the ground by the long tines 103a and a release point where the agricultural product is disengaged from the tines 103a.

The harvesting device 100 also comprises a plurality of bands 104 fixed to the frame 101, juxtaposed along the main axis of extension "A" and spaced from each other in such a way that each harvesting element 103 is at least partly interposed between two consecutive bands 104.

The bands 104 are defined by curved members shaped in such a way as to surround the axis of extension "A" at least at the forward stroke of the 103 (that is, the closed path).

Preferably, the harvesting device 100 comprises agricultural product unloading means 106 located downstream of the pick-up means 102 (more specifically, downstream of the release point), configured to transport the agricultural products and release them at the sides (or, if necessary, at the back) of the pulling vehicle.

More precisely, the unloading means 106 form a supporting surface "B" for the agricultural products harvested and are mobile along the main axis of extension "A" to release the agricultural products to the sides of the pulling vehicle.

Consequently, the axis of extension "A" is an axis of movement of the unloading means 106. This axis is transversal, preferably at right angles, to the harvesting axis described above.

Hereinafter, unless otherwise specified, the axis "A" denotes both the axis of extension and the axis of movement.

In the preferred embodiment, the device 100 (and more specifically, the unloading means 106) comprises a conveyor belt 106a operatively located downstream of the pick-up means 102 and forming a supporting surface "B" for the agricultural products transported by the conveyor unit 1.

More specifically, the conveyor belt 106a forms a supporting surface "B" which is mobile along the axis "A" to release the agricultural products to the sides of the pulling vehicle.

It should be noted that the term "conveyor belt" is used to mean any cyclic movement apparatus capable of defining a mobile supporting surface for the products, such as, for example, a chain conveyor, a track conveyor or the like.

The conveyor belt 106a (that is, the unloading means 106) extends along the axis of extension (or axis of movement) "A" between a first end 109a and a second end 109b, opposite to the first end 109a.

In the embodiment illustrated, the unloading means 106 are configured to move the products on the supporting surface "B" from the first end 109a towards the second end 109b, which, in use, constitutes a release zone "Z" for the agricultural products.

More precisely, the conveyor belt 106a forms a supporting surface "B" for the agricultural products mobile from the first end 109a to the second end 109b.

Further, the conveyor belt 106a (that is, the unloading means 106) extends between a first longitudinal edge 107a, associated with the pick-up means 102 to receive the agricultural products harvested, and a second longitudinal edge 107b opposite to the first 107a.

Thus, the products in motion along the harvesting axis cross the first edge 107a to pass from the pick-up means 102 to the unloading means 106.

Preferably, the frame 101 also comprises at least one side panel 108a rising transversally to the conveyor belt 106a (that is, to the supporting surface "B").

More precisely, the side panel 108a is located in the proximity of the second longitudinal edge 107b in such a way as to form a stopping element (or guide) for the agricultural products.

In effect, the side panel 108a extends transversely to the supporting surface "B" along the main axis of extension "A" in such a way as to guide the agricultural products towards the release zone while preventing them from falling off the device at the wrong point.

According to the invention, the device 100 is equipped with at least one cleaning unit 1 located in the proximity of the unloading means 106 (that is, of the conveyor belt 106a).

More precisely, the cleaning unit 1 comprises a wheel 2 comprising a peripheral annular surface 3 and rotatable about its own axis of rotation "C". It should be noted that the wheel 2 extends along the axis of rotation "C" between a first face 7a, facing the pick-up means 102, and a second face 7b, opposite to the first face 7a.

Thus, the axis of rotation "C" is transversal to the axis of movement "A" (and preferably parallel to the supporting surface "B").

The wheel 2 is positioned at a predetermined height in such a way as to form, between the peripheral annular surface 3 and the supporting surface "B", an agricultural product feed section 4.

The term "height" is used to mean the distance from the ground or, more in detail, a distance between the axis of rotation "C" and the supporting surface "B".

It should be noted that the direction of rotation of the wheel 2 is the same as the direction of movement of the supporting surface "B", that is, of the conveyor belt 106a, so as to "pull" the agricultural products into the feed section 4, directing them along the conveyor belt 106a itself.

Thus, the wheel 2 is associated with the frame 101 of the device 100 in such a way that the peripheral annular surface 3 is positioned at a predetermined distance (which, in some applications, might also be zero) from the unloading means 106, in particular from the supporting surface "B" so that the zone interposed between the peripheral annular surface 3 and the supporting surface "B" defines a pulling section for the agricultural products.

Figure 1:
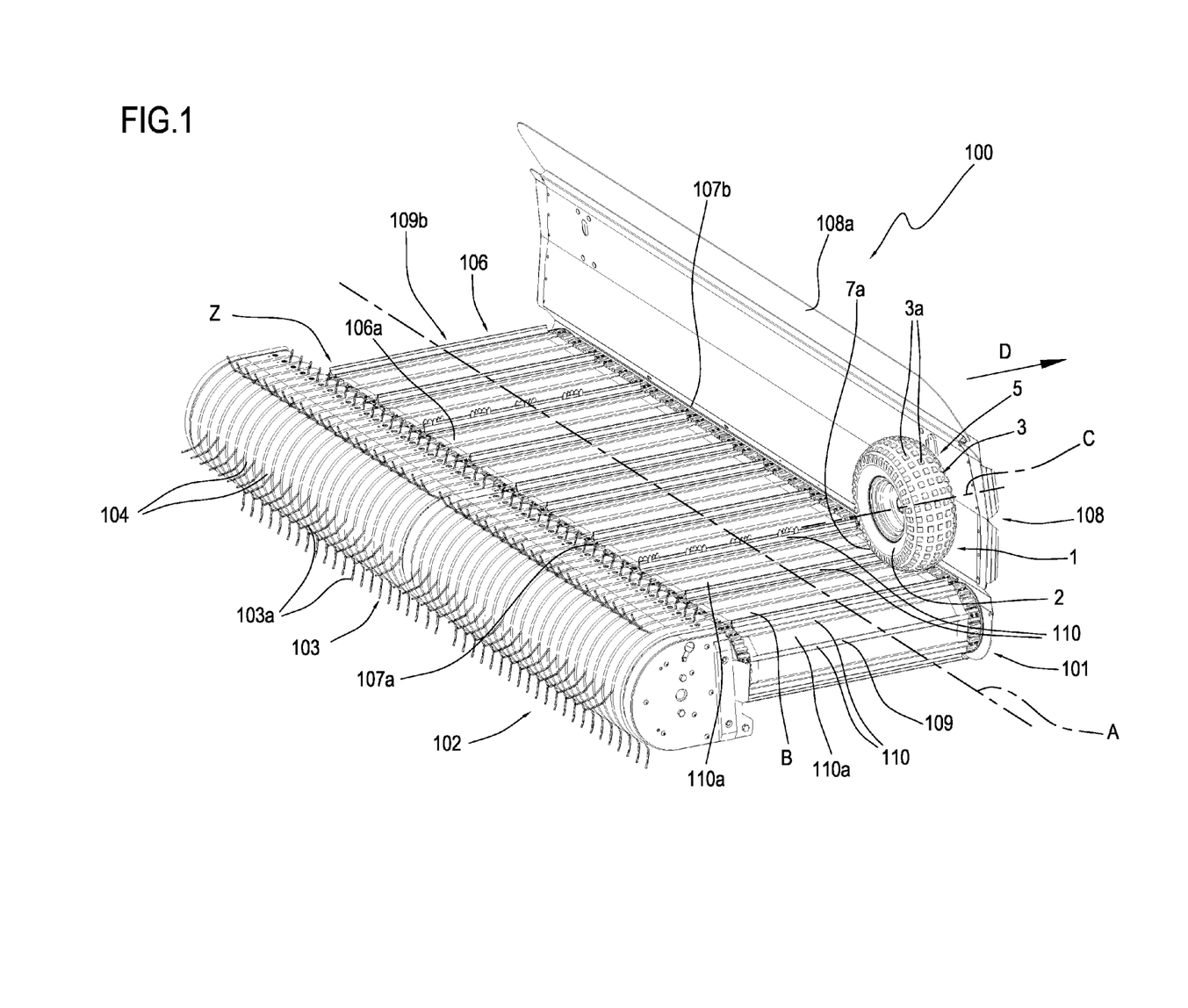
Figure 2:
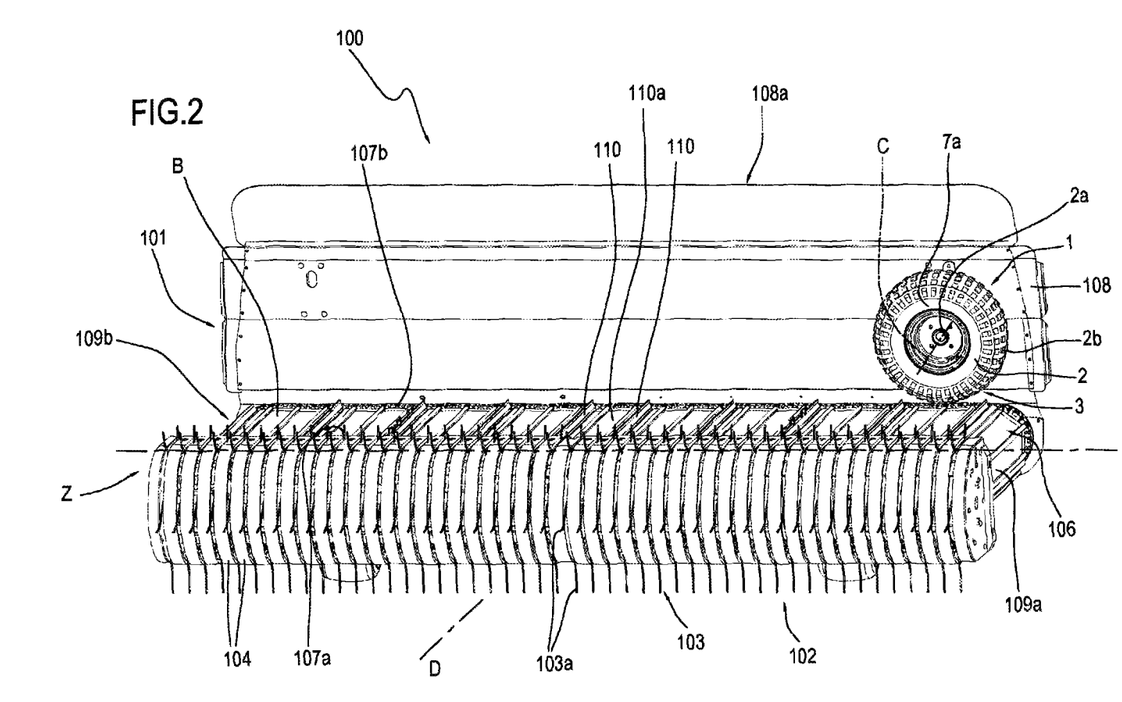
FIG. 2 shows a perspective view of the agricultural product harvesting device of FIG. 1.
Figure 3:
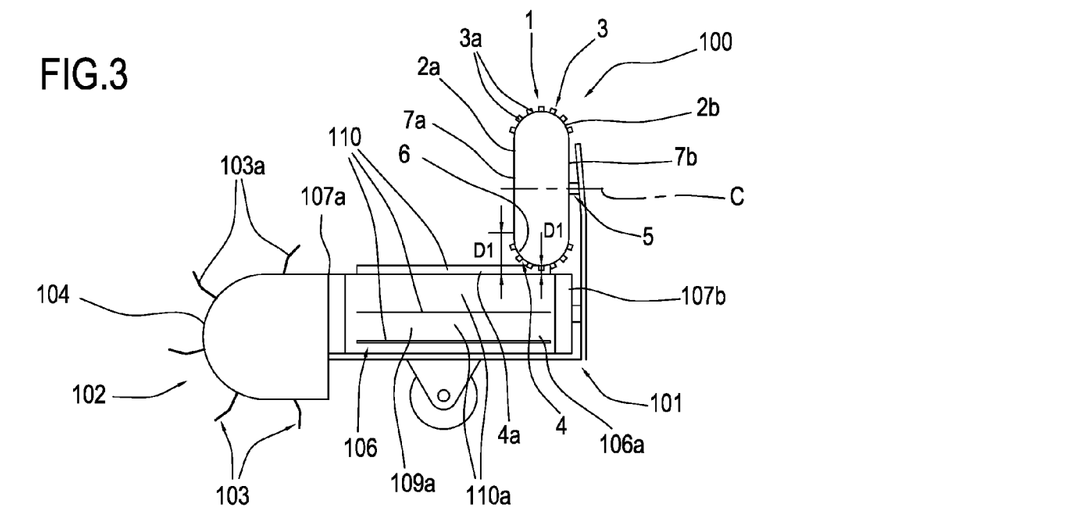
FIG. 3 shows a schematic side view of the agricultural product harvesting device of FIG. 1.

Preferably, (as illustrated in FIG. 1) the cleaning unit 1 comprises at least one wheel 2 located in the proximity of the first end 109a of the conveyor belt 106a (or, more generally, of the unloading means 106).

Advantageously, the wheel 2 allows keeping clean also the first end 109a, opposite to the release end, where the conveyor belt 106a alone is unable to effectively grip the agricultural products in order to feed them towards the release zone.

In effect, as mentioned above, the wheel 2 produces a pulling action in the feed section 4, that is, between the peripheral annular surface 3 of the wheel 2 and the supporting surface "B" of the conveyor belt 106a (or, more generally, of the unloading means 106).

It should be noted that in the preferred embodiment, the feed section 4 has at least one stretch 4a which decreases in size.

Preferably, the stretch 4a is the initial stretch, with reference to the axis along which the products reach the pick-up means (defined above as "harvesting axis").

In other words, the initial stretch 4a of the feed section is defined by the part of the section 4 facing the first edge 107a of the conveyor belt 106a, that is, facing the pick-up means 102.

It should be noted that the expression "initial stretch" is used because the infeed area of this stretch faces the pick-up means and is thus aligned with the harvesting axis (transversal, preferably at right angles, to the axis of extension).

Thus, the stretch 4 extends from the first face 7a of the wheel 2 towards the second face 7b in order to form a guide which facilitates feeding of the agricultural products.

In other words, the initial stretch 4a of the feed section 4 extends between a first infeed area whose size "D1" is larger, and a second area whose size "D2" is smaller.

It should be noted that the first area is located at the first face 7a of the wheel 2.

In the preferred embodiment, the decreasing size of the initial stretch 4a is defined by a peripheral annular surface 3 with rounded cross section (e.g. a tyre).

Alternatively, (not illustrated), if the peripheral annular surface 3 has a substantially flat cross section, the stretch 4a (that is, the guide) may be obtained by inclining the axis of rotation "C" of the wheel relative to the supporting surface "B" by an angle greater than 90°.

To connect the wheel 2 to the frame 101 of the device 100, the cleaning unit 1 comprises specific joining means 5 configured to connect the wheel 2 to the device 100 in such a way that the axis of rotation "C" of the wheel 2 is transversal to the axis of movement "A".

The joining means 5 are also configured to position the peripheral annular surface 3 at the aforementioned predetermined height so as to form, between the peripheral annular surface 3 and the supporting surface "B", an agricultural product feed section 4.

It should be noted that the joining means 5 are connected (fastened) to a supporting member 108 extending transversally to the supporting surface "B", rising from the second edge 107b of the unloading means 106.

In this embodiment, the joining means 5 are embodied by a pin fixed to the frame 101 of the device 100 and rotatably associated with the wheel 2.

Preferably, the joining means 5 of the cleaning unit 1 are fastened to the side panel 108a and oriented in such a way that the axis of rotation "C" of the wheel 2 is transversal to the axis of movement "A". Thus, the supporting member 108 is defined by the side panel 108a.

Preferably, the peripheral annular surface 3 of the wheel 2 (or of each wheel 2) extends annularly with a series of apexes and grooves, to make the action of the cleaning unit 1 on the products forceful.

In other words, the peripheral annular surface 3 of the wheel 2 is substantially a rough surface so as to increase its friction (and hence its forcefulness) on the agricultural products.

Preferably, the peripheral annular surface 3 comprises a plurality of notches or teeth 3a projecting radially from it to form a plurality of apexes designed to make the action of the cleaning unit 1 on the products forceful.

In the embodiment illustrated, the peripheral annular surface 3 has a plurality of notches arranged in circles in a plurality of circular rows substantially parallel to each other, so as to make the action of the wheel 2 uniform.

In order to adapt the action of the cleaning unit 1 to its real instantaneous requirement, it also comprises elastic means 6 operatively interposed between the joining means 5 and the peripheral annular surface 3 of the wheel 2.

The elastic means 6 are configured to allow movement of the peripheral annular surface 3 along an axis transversal to the axis of rotation "C" of the wheel 2 between at least a first position, in use proximal to the supporting surface "B" and a second position, in use distal from the supporting surface "B".

Advantageously, that way, the size of the feed section 4 is adapted to an instantaneous quantity of said agricultural products passing through the feed section (4), so as to increase the friction on said products (that is, the forcefulness of the wheel 2) on the products.

More precisely, the elastic means 6 are configured to keep the wheel at the second position, that is, proximal to the supporting surface "B".

Advantageously, as the quantity (or flow rate) of product increases, it is the agricultural products themselves which act on the peripheral annular surface 3, pushing it towards the first position.

In other words, the elastic means 6 have a predetermined rigidity, producing resistance to displacement from the second to the first position. When this resistance is overcome, they allow movement.

Thus, the elastic means 6 allow the peripheral annular surface 3 to adapt to the products, preventing blockages and jams at the feed section 4.

In the embodiment illustrated, the wheel 2 comprises a substantially rigid rim 2a (connected to the joining means 5) surrounded by an elastically deformable tyre 2b. It should be noted that the tread of the tyre 2 constitutes the peripheral annular surface 3 of the wheel 2.

In this embodiment, the elastic means 6 are at least partly defined by the elasticity of the tyre 2b.

In other words, the elastic means 6 are at least partly formed by an annular inner tube (not illustrated) interposed between the tyre 2b and the rim 2a (as well as by the deformability of the material the tyre 2b is made of).

Advantageously, this solution, besides being high-performing, is also simple and inexpensive to produce.

Moreover, the use of a tyre 2b with a rounded cross section creates the decreasing size of the initial stretch 4a of the feed section 4.

Alternatively, or in combination, the elastic means 6 may be at least partly formed by a suspension (not illustrated) operatively interposed between the joining means 5 and a hub (or rim 2a) of the wheel 2.

Preferably, as mentioned above, the cleaning unit 1 is motor-driven.

Thus, the cleaning unit 1 comprises actuator means associated with the wheel 2 for driving it in rotation about its own axis of rotation "C".

The actuator means may be dedicated to the cleaning unit 1 or they be defined by drive transmission means associated with the conveyor belt 16 and/or with the pulling vehicle.

Preferably, whatever the case, the device 100 (or the unit 1) comprises a synchronizing unit (not illustrated) configured to correlate the translational speed of the conveyor belt 16 with the rotational speed of the wheel 2.

Advantageously, this avoids slipping between the wheel and the conveyor belt which might reduce the efficiency of feeding, and hence of cleaning.

In the preferred embodiment, however, the actuator means are embodied by the conveyor belt 106 itself.

In this embodiment, the peripheral annular surface 3 of the wheel 2 abuts against the conveyor belt 106a (that is, against the supporting surface) in such a way that the movement of the conveyor belt 106a itself drives the wheel in rotation about its axis of rotation "C".

More precisely, the conveyor belt comprises a plurality of transversal bars 110 (transversal to the axis of belt movement "A") projecting from the supporting surface "B".

The bars 110 are such as to mesh (in gear-like fashion) with the teeth or notches 3a protruding from the peripheral annular surface 3 of the wheel 2 in order to drive it in rotation.

Thus, the wheel 2 is counter-rotating relative to the belt 106 and driven by it.

In this regard, it should be noted that the bars 110 are made of a material able to transmit motion, preferably steel.

In light of the above, therefore, the wheel 2 is located at a height such that the teeth or notches 3a have a free end located at a respective height which is lower than a corresponding free end of the bars 110.

Hence, between two consecutive bars 110 there is defined a channel 110a in which the teeth or notches 3a of the peripheral annular surface 3 are located in such a way as to produce the motion of the wheel 2.

In an alternative embodiment (FIG. 4), the harvesting device 100 is equipped with a plurality of cleaning units 1 located one after the other along the axis of extension "A".

Figure 4:
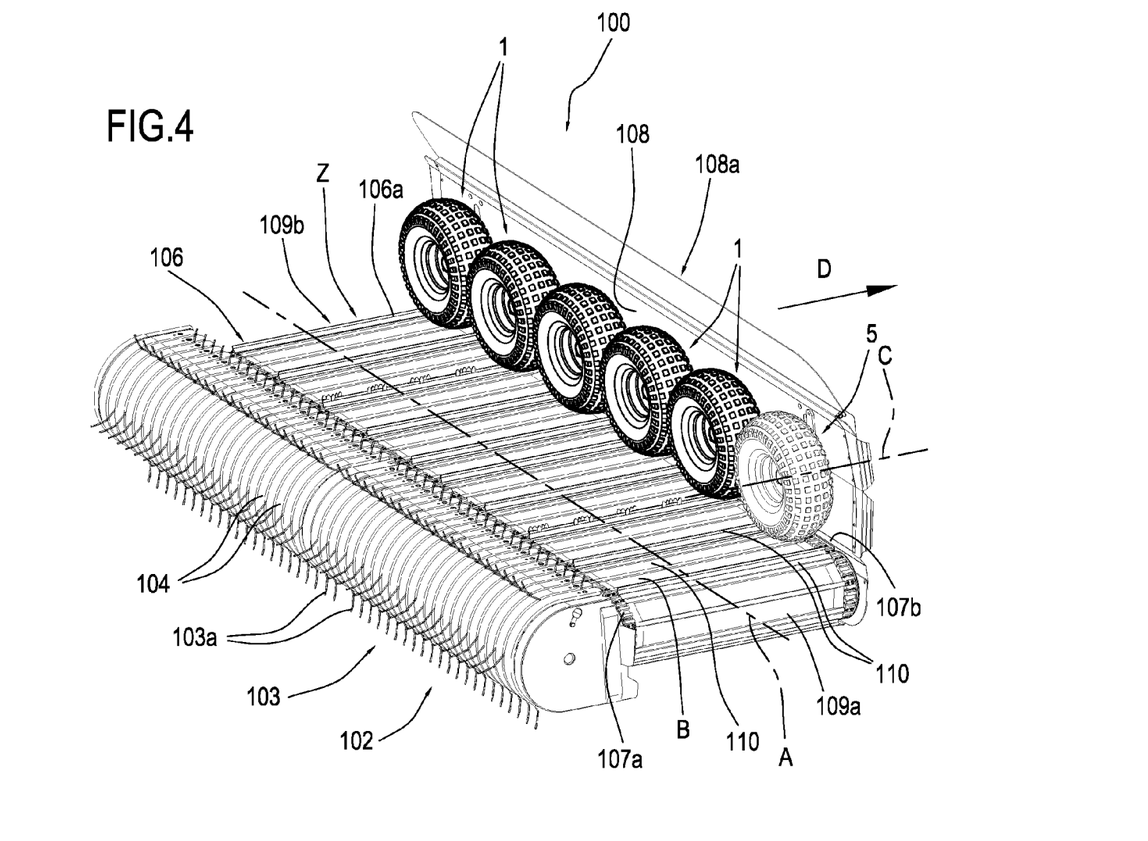
FIG. 4 shows a perspective view of the agricultural product harvesting device according to the invention in a further embodiment of it.

This guarantees their maximum action on the products to be unloaded, and consequently, the maximum cleaning effect of the conveyor belt 106a (that is, of the unloading means 106).

This invention also has for an object a method for improving a prior art harvesting device for harvesting agricultural products.

In other words, the method according to the invention, entails improving the harvesting device by installing one or more cleaning units 1.

More precisely, the method comprises firstly determining the end from which the agricultural products are released by the unloading means 106 (or by the conveyor belt 106a) depending on the direction of movement thereof.

Next, or beforehand, a wheel 2 is provided which has a peripheral annular surface 3 preferably having one or more of the features described in the foregoing.

The wheel 2 is then mounted at one end of the unloading means (or conveyor belt 106a) opposite to the aforementioned releasing end 109b (that is, at the first end 109a) and fixed to a frame 101 of the harvesting device 100.

The wheel 2 may be fixed to a side panel 108a or to a supporting member 108 rising from the supporting surface "B" defined by the unloading means 106 (or by the conveyor belt 106a).

Fixing is accomplished preferably using the joining means 5 described above and in such a way that the wheel 2 is rotatable about its axis of rotation "C" transversally to the axis of extension "A".

Further, the wheel 2 is mounted (that is, fixed) in such a way that the peripheral annular surface 3 is located at a predetermined height (that is, distance from the supporting surface "B") such that an agricultural product feed section 4 is formed between the selfsame peripheral annular surface 3 and the supporting surface B.

For the structural features of the elements mentioned in the method, the reader is referred to what is described above regarding the cleaning unit 1 and the harvesting device 100.

The invention achieves the preset aims and brings important advantages.

In effect, the use of a rotatable cleaning unit located in the proximity of the conveyor belt (and in conjunction therewith) allows the belt to be kept clean by preventing the products from accumulating in zones that would require added maintenance for the harvesting devices.

Moreover, mounting the cleaning unit at the end of the belt opposite to the release zone makes it possible to facilitate feeding towards this zone of those products which tend to build up without being unloaded.

Furthermore, installing a wheel having a rim and a tyre, substantially the same as a road vehicle wheel makes this improvement to the harvesting device at once effective and inexpensive.

What is claimed is:
1. A device for harvesting long agricultural products, comprising:

a frame having a main axis of extension (A) which, during use, is kept transversal to an advancing axis (D) of the device;

pick-up means designed to harvest agricultural products from the ground;

unloading means located operatively downstream of the pick-up means, forming a supporting surface (B) for the agricultural products harvested and mobile along said main axis of extension (A) for releasing the agricultural products to a side of said device;

said unloading means comprising a conveyor belt extending along said axis of extension (A) between a first end and a second end, opposite to the first end, and laterally delimited by a first longitudinal edge, associated with the pick-up means, and by a second longitudinal edge opposite to the first edge, wherein an external surface of said conveyor belt forms said supporting surface (B) mobile from the first end to the second end;

at least a cleaning unit positioned above said supporting surface (B) of the unloading means and having:

a circular wheel comprising a peripheral annular surface extending annularly with a series of apexes and grooves along its circumference and rotatable about its own axis of rotation (C), joining means designed to connect said wheel to said harvesting device so that said axis of rotation (C) is transversal to said axis of extension (A) and positioned at a predetermined height and its peripheral annular surface faces the supporting surface (B) to form, between the peripheral annular surface of the wheel and the supporting surface (B), an agricultural product drag section.

2. The harvesting device according to claim 1, characterized in that said frame comprises at least one supporting element rising transversally to said unloading means and positioned on said second longitudinal edge; said joining means of the cleaning unit being anchored to said supporting element so that said axis of rotation (C) of the wheel is transversal to said axis of extension (A) and said peripheral annular surface is positioned a predetermined distance from said supporting surface (B) thereby forming the agricultural product drag section.

3. The harvesting device according to claim 1, characterized in that said unloading means extends along the axis of extension (A) between a first end and a second end, opposite to the first end and is designed to move the products from the first end towards the second end, in use forming an agricultural product release zone (Z); said cleaning unit being positioned at said first end.

4. The device according to claim 1, characterized in that said peripheral annular surface of the wheel abuts against the conveyor belt wherein the movement of said conveyor belt drives the rotation of the wheel about its own axis of rotation (C).

5. The device according to claim 4, characterized in that said conveyor belt comprises a plurality of transversal bars projecting from the supporting surface (B); said peripheral annular surface of the wheel comprising a plurality of teeth or notches engageable by said bars for driving the rotation.

6. The harvesting device according to claim 1, characterized in that said wheel extends along the axis of rotation (C) between a first face, facing the pick-up means, and a second face, opposite to the first face; said drag section comprising at least one decreasing portion from said first face towards said second face thereby forming a guide which promotes agricultural product feed.

7. The harvesting device according to claim 1, characterized in that said peripheral annular surface comprises a plurality of notches or teeth projecting radially from it to form a plurality of apexes.

8. The harvesting device according to claim 1, characterized in that it comprises elastic means operatively interposed between said joining means and said peripheral annular surface of said wheel and designed to allow radial movement of said peripheral annular surface between a first position and a second position, in use distal from said supporting surface (B) with respect to the first position, for adapting the size of said drag section to a quantity of said agricultural products passing through the drag section, so as to increase the friction on said products.

9. The harvesting device according to claim 8, characterized in that the wheel comprises a rigid rim connected to said joining means surrounded by an elastically deformable tyre in which a tread of said tyre forms the peripheral annular surface of the wheel; said elastic means comprising said elastically deformable tyre.

10. The harvesting device according to claim 1, characterized in that the axis of rotation (C) of said wheel is parallel to said supporting surface (B).

11. A device for harvesting long agricultural products, comprising:

a frame having a main axis of extension (A) which, during use, is kept transversal to an advancing axis (D) of the device;

pick-up means designed to harvest agricultural products from the ground;

unloading means located operatively downstream of the pick-up means, forming a supporting surface (B) for the agricultural products harvested and mobile along said main axis of extension (A) for releasing the agricultural products to a side of said device;

said unloading means comprising a conveyor belt extending along said axis of extension (A) between a first end and a second end, opposite to the first end, and laterally delimited by a first longitudinal edge, associated with the pick-up means, and by a second longitudinal edge opposite to the first edge, wherein an external surface of said conveyor belt forms said supporting surface (B) mobile from the first end to the second end;

at least a cleaning unit positioned above said supporting surface (B) of the unloading means and having:

a wheel comprising a peripheral annular surface and rotatable about its own axis of rotation (C), joining means designed to connect said wheel to said harvesting device so that said axis of rotation (C) is transversal to said axis of extension (A), wherein said peripheral annular surface is positioned at a predetermined height to form, between the peripheral annular surface and the supporting surface (B), an agricultural product feed drag section, wherein said conveyor comprises a plurality of transversal bars projecting from the supporting surface (B) and wherein said peripheral annular surface of the wheel comprises a plurality of teeth or notches, wherein said teeth or notches are engageable by said bars for driving the rotation of the wheel.

12. The harvesting device according to claim 11, characterized in that said peripheral annular surface of the wheel abuts against the conveyor belt wherein the movement of said conveyor belt drives the rotation of the wheel about its own axis of rotation (C).

13. The harvesting device according to claim 11, characterized in that the wheel comprises a rigid circular rim connected to said joining means surrounded by an elastically deformable circular inflatable tyre in which a tread of said tyre forms the peripheral annular surface of the wheel; said elastic means comprising said elastically deformable tyre.

14. A device for harvesting long agricultural products, comprising:
- a frame having a main axis of extension (A) which, during use, is kept transversal to an advancing axis (D) of the device;
- pick-up means designed to harvest agricultural products from the ground;
- unloading means located operatively downstream of the pick-up means, forming a supporting surface (B) for the agricultural products harvested and mobile along said main axis of extension (A) for releasing the agricultural products to a side of said device; said unloading means extending between a first longitudinal edge, associated with the pick-up means for receiving said agricultural products, and a second longitudinal edge opposite to the first edge;
- at least a cleaning unit positioned above said supporting surface (B) of the unloading means and having:

a wheel comprising a peripheral annular surface and rotatable about its own axis of rotation (C), joining means designed to connect said wheel to said harvesting device so that said axis of rotation (C) is transversal to said axis of extension (A) and positioned at a predetermined height to form, between the peripheral annular surface and the supporting surface (B), an agricultural product drag section;

wherein said wheel extends along the axis of rotation (C) between a first face, facing the pick-up means, and a second face, opposite to the first face, said drag section comprising at least one decreasing portion from said first face towards said second face of the wheel thereby forming a guide which promotes agricultural product drag;

wherein said wheel comprises a rigid circular rim connected to said joining means surrounded by an elastically deformable circular inflatable tyre in which a tread of said tyre forms the peripheral annular surface of the wheel; said elastic means comprising said elastically deformable tyre.

15. The harvesting device according to claim 14, characterized in that the decreasing size of the decreasing portion of the drag section is defined by the peripheral annular surface of the tire having a rounded cross section.

16. The harvesting device according to claim 14, characterized in that the direction of rotation of the wheel is the same as the direction of movement of the conveyor belt in correspondence of the supporting surface (B).

* * * * *

UNITED STATES PATENT AND TRADEMARK OFFICE
CERTIFICATE OF CORRECTION

Page 1 of 1

PATENT NO. : 9,642,310 B2
APPLICATION NO. : 14/452022
DATED : May 9, 2017
INVENTOR(S) : Raffaele Ubaldi It is certified that error appears in the above-identified patent and that said Letters Patent is hereby corrected as shown below:

In the Claims

Column 12, Line 54, being Line 31 of Claim 11, after "product" delete "feed".

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*